May 2, 1939.  T. F. PETERSON  2,156,352
HEATING DEVICE
Filed Dec. 9, 1937  2 Sheets-Sheet 1

INVENTOR.
Thomas F. Peterson
BY
ATTORNEY.

May 2, 1939.  T. F. PETERSON  2,156,352
HEATING DEVICE
Filed Dec. 9, 1937   2 Sheets-Sheet 2
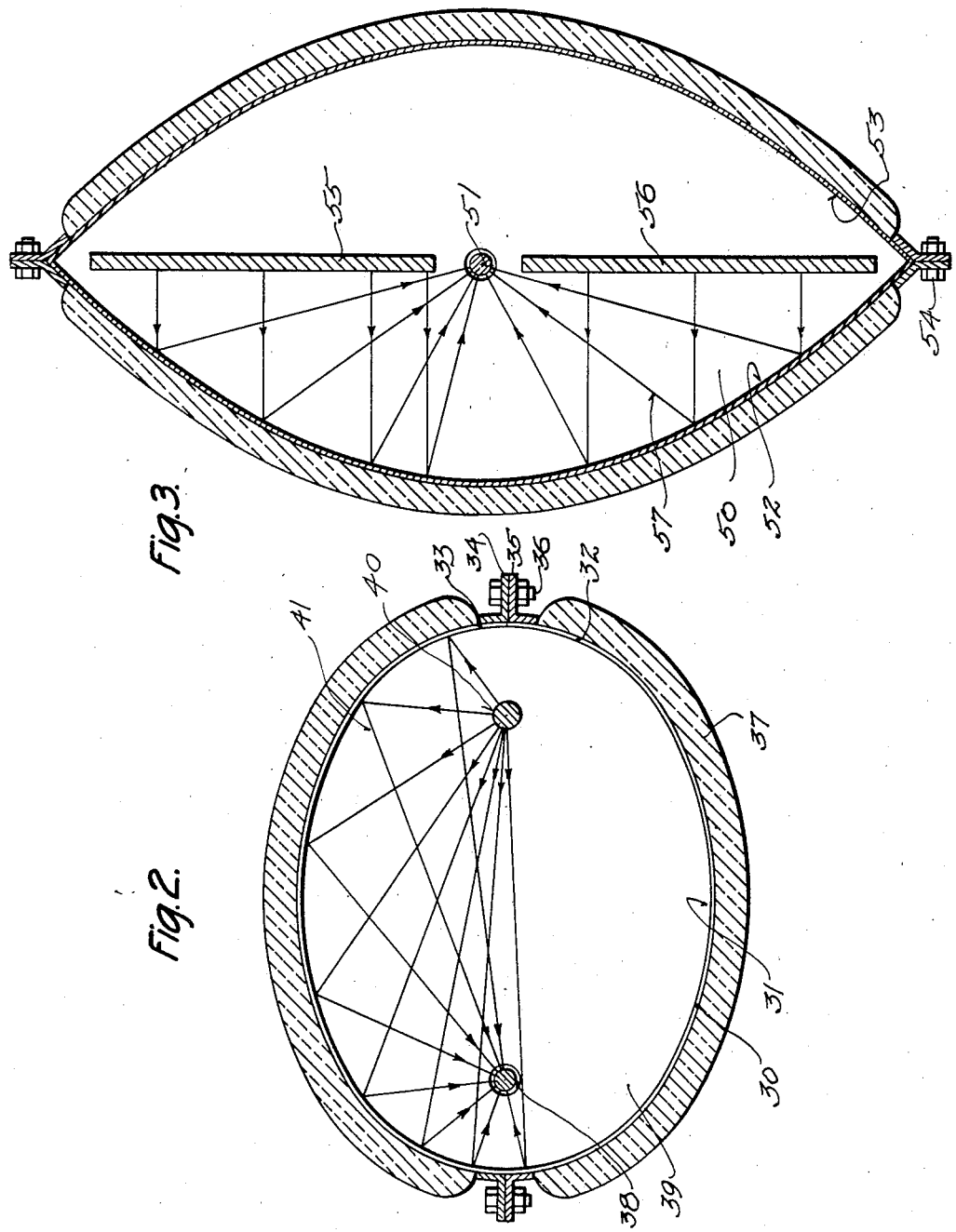
INVENTOR.
Thomas F. Peterson
BY
ATTORNEY.

Patented May 2, 1939

2,156,352

UNITED STATES PATENT OFFICE 2,156,352

HEATING DEVICE

Thomas F. Peterson, Worcester, Mass.

Application December 9, 1937, Serial No. 178,876

REISSUED
DEC 16 1941

8 Claims. (Cl. 13—20)

This invention relates to heaters and methods of heating, more particularly designed for the baking or heating of longitudinal elements as wires, rods, cables or the like. The customary practice for treating such elements is to wind them on reels or in coils and place them in an oven, as for example in the annealing of wire, curing rubber-coated elements, drying cable, etc. Sometimes the elements are passed through chambers heated by gas, oil, coal, hot air or steam. When the elements are of metal, induction heating or resistance heating by the passage of an electric current may be used. All these methods, however, are objectionable either from the lack of efficiency or the lack of uniformity in the heat treatment.

The present invention provides a method of heating exteriorly, and apparatus therefor, that operates both with efficiency and uniformity. It furthermore provides an exact control of the heating action. Moreover by heating exteriorly under closely controlled conditions in accordance with this invention, it is found that the amount of heating required for baking, vulcanizing, etc., can be applied without unduly raising the interior; for instance in some forms of rubber-jacketed cable insulation is used in the interior of the cable that deteriorates if exposed to the temperature required for rubber vulcanization, and the present invention permits the manufacture of such cable without injury to the heat-sensitive interior insulation.

In general the objects of the present invention are accomplished by means of reflected radiant heat waves in place of or in conjunction with direct heating. A practical embodiment is that of a closed cylindrical oven with an interior reflecting surface and having a focal line on which the reflected heat waves can be condensed; the wire, cable or other longitudinal element is positioned and moved along the focal line. As an instance the embodiment (hereinafter more fully described) can be that of a cylinder of elliptical right section with the element to be heated extending along a line passing through one of the foci of the ellipse; in this case the heating means, such as an electric resistance wire, can be positioned along the locus of the conjugate focus.

In the accompanying drawings:

Fig. 2 illustrates an enlarged right section on the line 2—2 of Fig. 1; and

Fig. 3 illustrates another form of right section for the heater.

Figure 1:
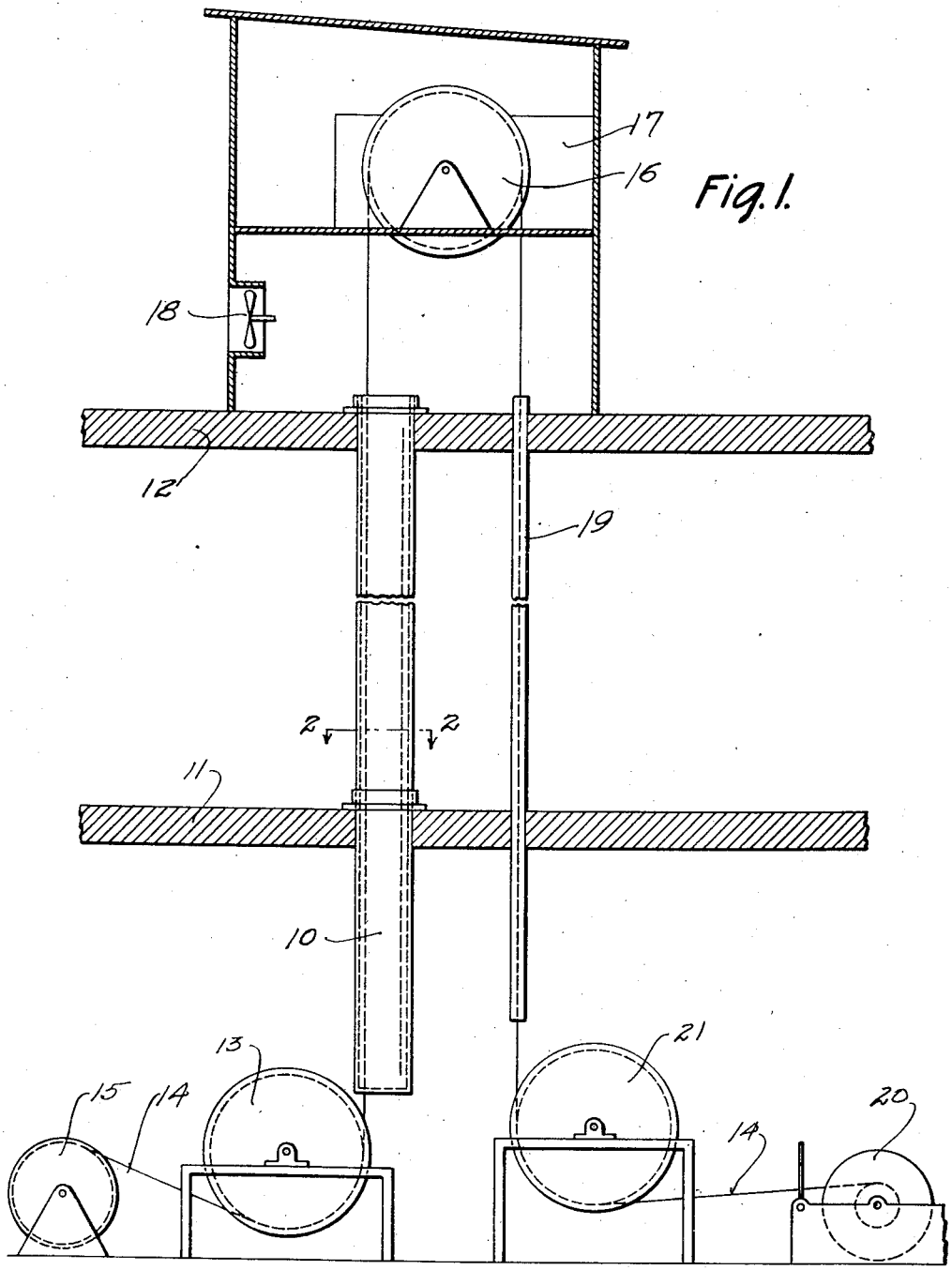
Fig. 1 is an elevation of an assembly illustrating an embodiment of the present invention.

The heater or oven 10 is illustrated as a vertical tower or cylinder suitably supported from the floors 11 and 12; the length of the tower can be varied within wide limits depending upon the time required for heating and the speed with which the element to be heated is drawn through the tower. At the lower end of the tower a guiding sheave 13 or other suitable means is placed to properly position the element 14, such as wire to be annealed or baked, as it is drawn from the reel 15. At the upper end of the tower there is mounted a second guiding sheave 16 which can be operated from a motor and suitable transmission gearing in housing 17 for drawing the wire through the heating tower. Before passing over the driving sheave 16 it may be desirable to cool the wire as it comes from the heating tower by means of a current of air created by a fan 18. Or as the wire leaves the driving sheave, it can be passed downwardly through a cooling tower 19 before being drawn onto the spool 20 over the guiding sheave 21. These parts are of course subject to change and substitution, depending upon the use made of the tower; for instance when wire is to be coated and then baked, the sheave 13 can be placed in a tank or tray containing the coating material to guide and submerge the wire in the coating material. As another instance the cooling tower 19 can be built similarly to the heating tower 10 whereby the heat given off by the wire on cooling can be utilized as a preliminary heating means for another wire or a different portion of the same wire.

The heating tower as illustrated in Fig. 2 has as its right section an ellipse. The metal wall 30 is provided with an interior reflecting surface 31. The metal wall can be made in sections 32, 33 with angles 34, 35 welded thereto and bolted together by bolts 36. An insulating jacket 37 of asbestos or the like is placed about the exterior of the tower.

The tower can be open at both the top and bottom but preferably these ends are closed in order to give a more effective regulation and permit operations under pressure if desired. When so closed at both ends the tower can be ventilated by providing suitable inlets and outlets for the circulation of a gaseous medium; when a coating is being baked, the solvent vapors drawn through an outlet can be suitably condensed.

The element or wire 14 to be heat-treated is passed through a bushing 38 in the base 39 when the tower is closed. The bushing is located at a focus of the elliptical cross section. There can be a similar bushing located at the focus at the upper end, and if found necessary additional guides of porcelain or the like along the length of the tower can be provided. The purpose is to maintain the wire or element being treated in a focal line of the tower. The bushings in the closed ends of the tower can be of refractory material as porcelain or the like; and the bushings can be longitudinally extended from the ends of the tower to give a gradual heating of the moving element as it enters the tower and to give a gradual cooling of the moving element as it leaves by the transfer of heat along the bushing.

At the other focus 40 there is mounted a heating element. This can conveniently be an electrical resistance element in the form of a rod with suitable connections for current, or it may be a gas-fired hollow tube. The heat rays thrown off by the heating element 40 strike the reflecting inner surface of the tower as shown by the lines 41 and are reflected upon the other focal line 38.

In Fig. 3 there is illustrated in cross-section another embodiment. In this form the right section 50 is parabolic with the wire to be treated at the focus 51. To provide a closed tower two parabolic walls 52 and 53 secured together by bolts 54 are provided and having the common focus 51. Heat is provided by plates 55, 56 placed perpendicularly to the axis of the parabola and on a line through the focus; the parallel heat rays 57 are thereby reflected back of the wall and condensed on the focal line. The plates may be any convenient form of heating means, for instance, they can be built up of strip or grid electrical heaters and if desired the strips or grids can be mounted in a matrix of refractory material; or the heating means can be gas-fired plates and for this purpose can be made hollow. The plates are suitably supported in the tower.

The embodiment of Fig. 3 need not necessarily comprise two parabolic walls as shown. One can be omitted and a heating plate used as a part of the cylindrical wall; in this case, the heating plate is preferably placed a distance beyond the focal line such as to equalize as nearly as possible the heating effect on all sides of the element being treated.

The operation of the heating device is believed obvious from the foregoing description. The wire, cable or other longitudinal element to be annealed, baked, vulcanized or otherwise heat-treated is maintained in the focal line of the cylindrical tower as determined by the right section of the tower. The element is drawn through the tower at a rate of speed depending upon the time period of heating, the degree of heat condensed upon the element and the height of the tower. Evidently these factors can be accurately controlled to give just the amount of heating necessary for each particular operation. Because of the controlled heating so obtained it has been found possible to vulcanize a rubber jacket or covering over a heat-sensitive insulation without injury to the insulation.

The tower is primarily intended for the heating of continuous elements as wire and the like to be drawn through the tower. It is possible, of course, to support an element in a stationary position along a focal line and flash on the heat for a length of time necessary to secure the effect desired. The element after treatment is then dismounted.

What is claimed is:

1. A heating device comprising in combination a cylindrical tower having a right section of a curvature providing a focus and having an interior reflective surface, said tower being provided with closed ends, means associated with the tower for supporting an element to be heat-treated along the focal line of the tower, said supporting means permitting movement of the element along the tower, refractory bushings mounted in the ends of the tower and along the focal line of the tower for permitting movement of the element while substantially sealing the interior of the tower to render the tower capable of operation under pressure or in the presence of an inert atmosphere, and heating means having its heating surface positioned in the tower so that heat waves radiating therefrom are reflected from the reflective surface and condensed upon the focal line of the tower.

2. A heating device comprising in combination a cylindrical tower having a right section of a curvature providing a focus and having an interior reflective surface, means associated with the tower for supporting an element to be heat-treated along the focal line of the tower, and heating means having its heating surface positioned in the tower so that heat waves radiating therefrom are reflected from the reflective surface and condensed upon the focal line of the tower.

3. A heating device comprising in combination a cylindrical tower of elliptical right section and having an interior reflecting surface, means associated with the tower for supporting an element to be heat-treated along a focal line of the tower, and heating means positioned at the conjugate focal line of the tower.

4. A heating device comprising in combination a longitudinally extending cylindrical wall having a right section of a curvature providing a focus and having a reflective surface facing the focal line, means associated with the wall for supporting an element to be heat-treated along the focal line, and heating means positioned with respect to the wall so that heat waves radiating from the heating means are reflected from the reflective surface and condensed upon the focal line.

5. A device for imparting energy by radiation comprising in combination a longitudinally extending cylindrical wall having a right section of a curvature providing a focus and having a reflective surface facing the focal line, means associated with the wall for supporting an element along the focal line, and a radiating source positioned with respect to the wall so that energy waves radiated therefrom are reflected from the reflective surface and condensed upon the element along the focal line.

6. Process of imparting energy by radiation to an element which comprises providing a longitudinally extending reflective surface having a focal line, supporting an element along the focal line, and imposing on the reflective surface energy waves emanating from a radiating source for condensation upon the element along the focal line.

7. Process of heating an element which comprises providing a longitudinally extending reflective surface having a focal line, supporting an element along the focal line, and imposing on the reflective surface heat waves emanating from a heat-radiating source for condensation upon the element along the focal line.

8. Process of heating an element which comprises providing a longitudinally extending reflective surface having a focal line, moving an element along the focal line, and imposing on the reflective surface heat waves emanating from a heat-radiating source for condensation upon the element along the focal line.

THOMAS F. PETERSON.

DISCLAIMER 2,156,352.—*Thomas F. Peterson*, Worcester, Mass. HEATING DEVICE. Patent dated May 2, 1939. Disclaimer filed February 10, 1940, by the patentee.

Hereby enters this disclaimer to the structure of claims 2 to 5 and the process of claims 6 to 8 except where the reflective surface provides a focal region of substantial area and the element treated is in cross-section substantially equal to or greater than the focal area.

[*Official Gazette March 5, 1940.*]